United States Patent [19]
Seifert et al.

[11] 4,318,552
[45] Mar. 9, 1982

[54] DEFLECTION DEVICE FOR SAFETY BELTS

[75] Inventors: Helmut Seifert; Karl Möndel, both of Schwäbisch Gmünd, Fed. Rep. of Germany

[73] Assignee: Repa Feinstanzwerk GmbH, Alfdorf, Fed. Rep. of Germany

[21] Appl. No.: 46,868

[22] Filed: Jun. 8, 1979

[30] Foreign Application Priority Data

Jun. 12, 1978 [DE] Fed. Rep. of Germany ... 7817604[U]

[51] Int. Cl.³ .............................................. A62B 35/02
[52] U.S. Cl. .................................... 280/801; 297/468
[58] Field of Search ............... 280/801, 802, 803, 804, 280/805, 806, 807, 808; 297/468, 469, 485; 16/125

[56] References Cited
U.S. PATENT DOCUMENTS

1,350,659  8/1920  Leavitt ................................... 16/125
4,013,306  3/1977  Imabuchi et al. ................... 280/803

FOREIGN PATENT DOCUMENTS

2431959  1/1976  Fed. Rep. of Germany ...... 297/468
2607170  9/1977  Fed. Rep. of Germany ...... 280/801
2311562 12/1976  France ................................. 280/801
 817590  8/1959  United Kingdom ................ 297/468

Primary Examiner—John A. Pekar
Attorney, Agent, or Firm—Herbert L. Lerner

[57] ABSTRACT

Deflection device for a safety belt which has one end attached to an automatic winder and the other end of the belt adapted for locking engagement. Between the automatic winder and the lock, the belt is routed over a fixed rounded deflection cross bar. The deflection crossbar and at least a portion of the deflection device for securing it to the vehicle constitute one continuous piece of metal made of a single piece of bent tube material.

4 Claims, 9 Drawing Figures

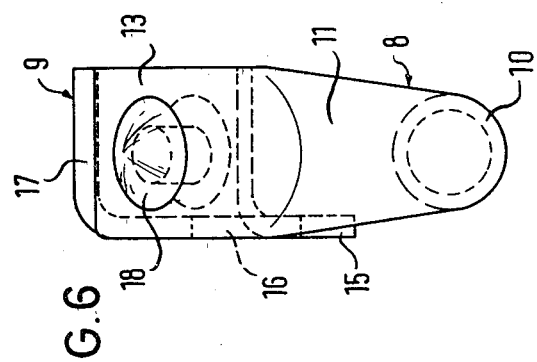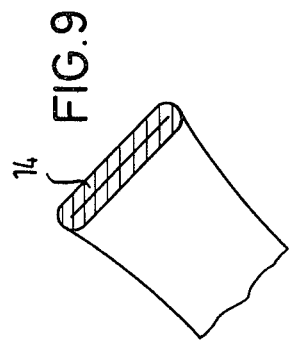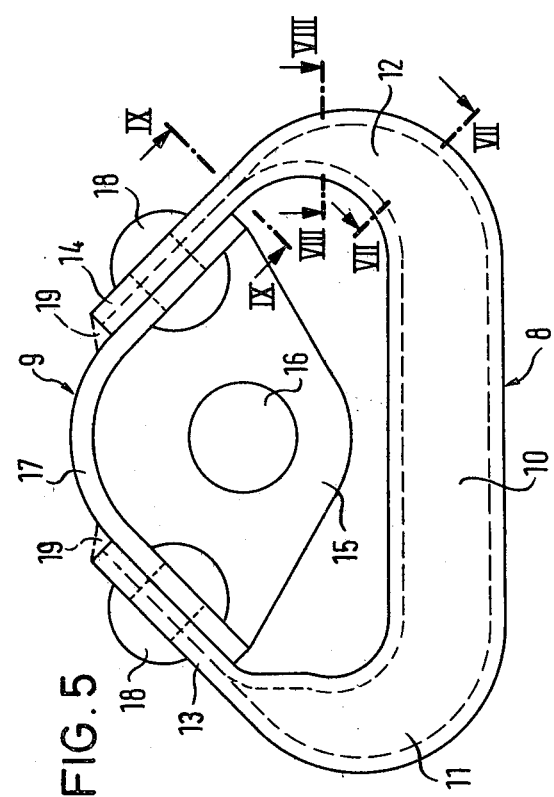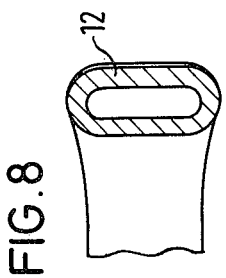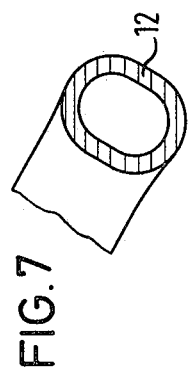

DEFLECTION DEVICE FOR SAFETY BELTS

BACKGROUND OF THE INVENTION

1. Field of the Invention

The invention relates to a deflection device for safety belts which is, at one end region thereof, rolled up in an automatic wind-up device and which is provided, at the other end thereof, with a lock. An in between-portion of the belt is routed over a fixed rounded crossbar which deflects the belt.

2. Description of the Prior Art

In the known arrangements of safety belts, the belt is routed over a deflection device which is hingeably secured to the frame of the vehicle. The deflection device is formed as a stamped part similar to a chain link and having a straight crossbar with rounded edges, over which the safety belt is passed. Experiments have shown, depending on the surface condition of the slide-area under load, that very high friction losses occur when the safety belt is sliding through the device, as well as wear of the belt material by squeezing, due to the small cross-section of the cross bar. These factors have a negative effect on the ratio of return or retraction force to pull-out force, a ratio which should be kept as small as possible.

SUMMARY OF THE INVENTION

An object of the present invention is to provide a deflection device for a safety belt which will result in materially reduced friction. Another object of the invention is to provide a deflection device which is simple and easy to manufacture and stable and sturdy under conditions of operation.

With the foregoing and other objects in view, there is provided in accordance with the invention a deflection device for a safety belt for attachment to a motor vehicle in which one end of the safety belt is rolled up on an automatic winder in an end region and the other end of the belt is adapted for locking engagement, with a belt portion between the automatic winder and the lock routed over a fixed rounded deflection crossbar, said deflection crossbar and at least a portion of the deflection device for securing it to the vehicle, constitute one continuous piece of metal made of a single piece of bent tube material.

BRIEF DESCRIPTION OF THE INVENTION

The invention, however, together with additional objects and advantages thereof will be best understood from the following description when read in connection with the accompanying drawings, in which:

FIG. 5 is a front view of another embodiment of the deflecting device made of a single piece of bent tube material and a metal stamping in accordance with the invention;

FIG. 6 is a side view of the deflecting device shown in FIG. 5;

FIG. 7 is a section of the bent tube at the start of curvature from the crossbar, taken along line VII—VII of FIG. 5;

FIG. 8 is a section of the bent tube at a further point from the crossbar to show flattening of the tube; taken along line VIII—VIII of FIG. 5; and FIG. 9 is a section of the tube taken along IX—IX of FIG. 5 to show a flattened end of the tube.

DETAILED DESCRIPTION OF THE INVENTION

In accordance with the invention the deflecting crossbar of the deflection device and at least a portion of the fitting which serves for fastening the deflection device to the vehicle frame, is made out of a single piece of bent tubing-material. The crossbar of the deflection device retains the tube profile, imparting to the crossbar, strength and stability as well as having an almost ideal sliding surface for the safety belt. Further treatment, as for example rounding of the edges of a stamped part etc., is not required after bending of the tube material, in accordance with the invention.

The circular tube material has an outer diameter of more than 12 mm in the zone of the deflection crossbar, preferably a diameter of at least 14 mm. Experiments have shown that particularly good results with respect to the sliding of the belt were achieved with tubes having a diameter of 14–20 mm.

A simple cost-saving manufacturing method for producing the deflection device is achieved by bending the tube material in a form similar to a chain-link. The ends of the tube are flattened, provided with openings for fastening the device to the vehicle, and the ends are superimposed upon each other. The flattened ends can be connected with each other, for example, by welding, rivets or the like, or they can be secured by means of the fastening screws which are used when the deflection device is mounted on the vehicle body, for example on the vehicle frame. A deflection device of high stability is obtained by making the cross section of the tube material which, in the cross bar of the deflection device is circular, decrease uniformly in cross section in the portion of the bent tube of the deflection device which extends from the crossbar to the flattened end.

According to another advantageous embodiment of the invention, the tube material is bent to a U-shape with flattened ends, which ends are connected with a fitting member which is a metal stamping having openings to secure the deflecting device to the vehicle.

Figure 1:
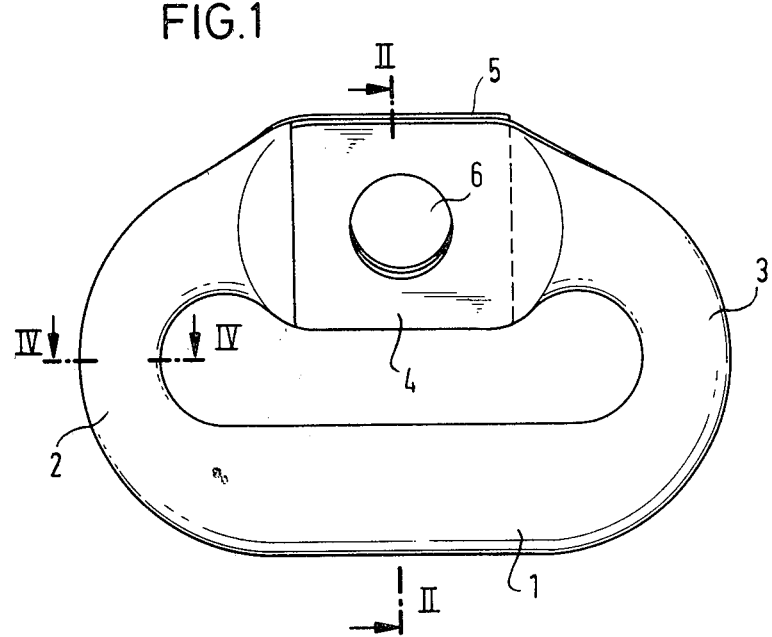
FIG. 1 is a front view of the deflecting device made of a single piece of bent tube material in accordance with the invention.
Figure 4:
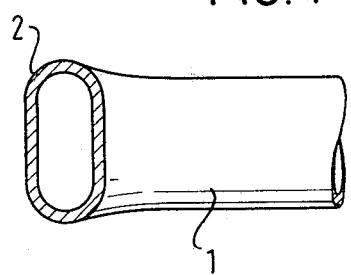
FIG. 4 is a partial sectional view of the deflecting device taken along line IV—IV of FIG. 1.
Figure 2:
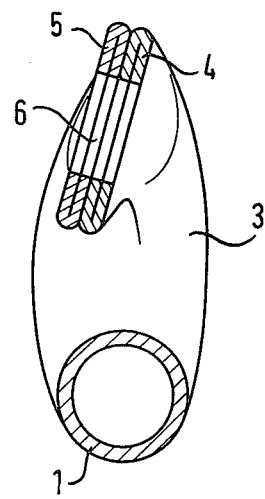
FIG. 2 is a sectional view of the deflecting device taken along line II—II of FIG. 1.
Figure 3:
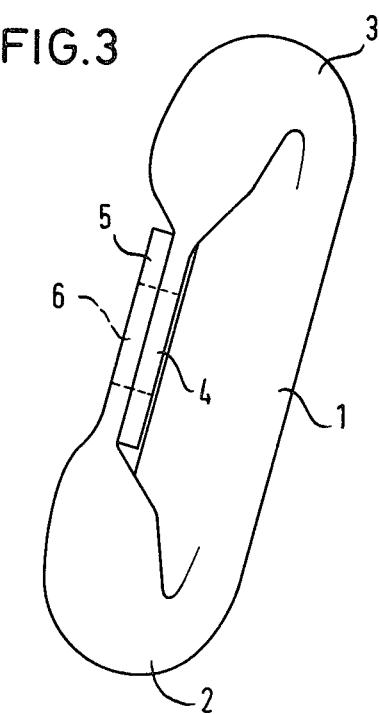
FIG. 3 is a side view of the deflecting device shown in FIG. 1.

In the embodiment illustration in FIGS. 1 to 4, the deflection cross bar consists of a single piece tube material which is bent to a shape similar to a chain link. In bending the tube to produce the deflection device of FIG. 1, a straight deflection cross bar 1 is formed which has a circular tube-cross-section as shown in FIG. 2. Bent portions 2 and 3 are disposed on both sides of the deflection cross bar 1. The wide surfaces of the completely flattened ends 4 and 5 are superimposed and the ends are provided with the openings 6 which are aligned to each other and serve for fastening the deflection device. The plane of the flattened ends 4 and 5 to each other makes an acute angle to the vertical median plane of the cross bar 1, as shown in FIG. 2, so that the fastening of the deflection device, for example to the frame of a motor vehicle, is facilitated. Also, shaping the device with an acute angle as above aids in preventing obstruction of the safety belt in its operation. The cross section of the tube material along the bent portions 2 and 3 becomes continuously or gradually flatter. In the embodiment of FIGS. 1–4, the tube material has an outer diameter of 18 mm in the region of the deflection cross bar 1 and also a smooth or slightly burled surface. The material of the tube is preferably steel.

In the embodiment according to FIGS. 5 to 9, the deflection device is made of two parts, that is, out of the U-shaped tube material 8 and out of a part 9 which is made of a metal stamping. The tube material similar to the above-described embodiment, has a straight deflection cross bar 10 with a circular tube cross section, two approximately U-shaped bent portions 11 and 12 whose cross section continuously gets flatter, as shown in sectional views of FIGS. 7 and 8, and also two completely flattened tube-ends 13 and 14, as shown in the cross-sectional view of FIG. 9. The part 9 consists of an approximately rhomboid-shaped area portion 15 with an opening 16 for fastening the device to the vehicle. A V-shaped flange 17 with its two V-shaped sides rectangularly bent extends from and is made of one piece with area portion 15. The flattened ends 13 and 14 are fastened to the ends of the flange 17 by means of rivets 18 or by welding, indicated by numeral 19.

There are claimed:

1. Deflection device for a safety belt for attachment to a motor vehicle in which one end of the safety belt is rolled up on an automatic winder in an end region and the other end of the belt is adapted for locking engagement, with a belt portion between the automatic winder and the lock routed over a fixed rounded deflection crossbar, said deflection crossbar having a straight bar and a tubular cross section and at least a portion of the deflection device for securing it to the vehicle, constitute one continuous piece of metal made of a single piece of bent tube material, wherein the cross section of the tube material which is circular in the region of the deflection cross bar gets continuously flatter towards the tube ends and, wherein the tube material is bent to form a loop with a straight deflection bar for the safety belt, and wherein the ends of the tube material are flattened and openings provided in the ends, and wherein the ends are superimposed upon each other with their widened surfaces and the openings in the ends aligned for securing the device to the vehicle.

2. Deflection device for a safety belt for attachment to a motor vehicle in which one end of the safety belt is rolled up on an automatic winder in an end region and the other end of the belt is adapted for locking engagement, with a belt portion between the automatic winder and the lock routed over a fixed rounded deflection crossbar, said deflection crossbar having a straight bar and a tubular cross section and at least a portion of the deflection device for securing it to the vehicle, constitute one continuous piece of metal made of a single piece of bent tube material, wherein the tube material is circular and has an outer diameter of more than 12 mm, and wherein the deflection crossbar is circular and has an outer diameter of more than 12 mm and, wherein the tube material is bent to form a loop with a straight deflection bar for the safety belt, and wherein the ends of the tube material are flattened and openings provided in the ends, and wherein the ends are superimposed upon each other with their widened surfaces and the openings in the ends aligned for securing the device to the vehicle.

3. Deflection device for a safety belt for attachment to a motor vehicle in which one end of the safety belt is rolled up on an automatic winder in an end region and the other end of the belt is adapted for locking engagement, with a belt portion between the automatic winder and the lock routed over a fixed rounded deflection crossbar, said deflection crossbar having a straight bar and a tubular cross section and at least a portion of the deflection device for securing it to the vehicle, constitute one continuous piece of metal made of a single piece of bent tube material, wherein the tube material is circular and has an outer diameter of more than 12 mm, and wherein the deflection crossbar is circular and has an outer diameter of more than 12 mm, and wherein the cross section of the tube material which is circular in the region of the deflection crossbar gets continuously flatter towards the tube ends and, wherein the tube material is bent to form generally U-shaped flattened ends, and wherein the thus spaced apart ends are connected with a metal part made as a metal stamping and having an opening for securing it to the vehicle.

4. Deflection device for a safety belt for attachment to a motor vehicle in which one end of the safety belt is rolled up on an automatic winder in an end region and the other end of the belt is adapted for locking engagement, with a belt portion between the automatic winder and the lock routed over a fixed rounded deflection crossbar, said deflection crossbar having a straight bar and a tubular cross section, and a portion of the deflection device for securing it to the vehicle, constitute one continuous piece of metal made of a single piece of bent tube material, wherein the tube material is bent to form generally U-shaped flattened ends, and wherein the thus spaced apart ends are connected with a metal part made as a metal stamping and having an opening for securing it to the vehicle, and wherein said metal part has a flat area with two rectangular sides and with an opening for securing it to the vehicle, and also has a V-shaped bent flange bent up from the rectangular sides to which the flattened ends of the tube material are fastened.

* * * * *